(12) United States Patent
Visentini Scarzanella

(10) Patent No.: US 10,997,473 B2
(45) Date of Patent: May 4, 2021

(54) OBJECT LOCALIZATION BASED ON SPATIAL RELATIONSHIPS

(71) Applicant: INTERNATIONAL BUSINESS MACHINES CORPORATION, Armonk, NY (US)

(72) Inventor: Marco Visentini Scarzanella, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 253 days.

(21) Appl. No.: 16/201,226

(22) Filed: Nov. 27, 2018

(65) Prior Publication Data
US 2020/0167614 A1 May 28, 2020

(51) Int. Cl.
*G06K 9/62* (2006.01)
*G06F 16/56* (2019.01)
*G06T 7/73* (2017.01)

(52) U.S. Cl.
CPC ........... *G06K 9/6282* (2013.01); *G06F 16/56* (2019.01); *G06T 7/73* (2017.01); *G06T 2207/10028* (2013.01); *G06T 2207/20016* (2013.01)

(58) Field of Classification Search
CPC .. G06K 9/6282; G06K 2209/40; G06F 16/56; G06T 7/73; G06T 2207/20016; G06T 2207/10028; G06T 7/70; G06T 2207/30244; G06T 2207/10024; G06T 2207/20081
See application file for complete search history.

(56) References Cited

U.S. PATENT DOCUMENTS

| 9,747,527 | B2 | 8/2017 | Baranowski et al. |
| 10,685,446 | B2* | 6/2020 | Fleishman ........... G06K 9/6296 |
| 2012/0321174 | A1 | 12/2012 | Tsymbal et al. |
| 2014/0125662 | A1* | 5/2014 | Amsterdam ............ G06T 17/10 |
| | | | 345/419 |
| 2017/0083751 | A1* | 3/2017 | Tuzel ................. G06K 9/00302 |
| 2018/0137644 | A1 | 5/2018 | Rad et al. |

OTHER PUBLICATIONS

Stern, "Automatic Localization of Locally Similar Structures Based on the Scale-Widening Random Regression Forest", 13th International Symposium on Biomedical Imaging, May 2016, pp. 1422-1425.
Massiceti, "Random Forests Versus Neural Networks—What's Best for Camera Localization?", International Conference on Robotics and Automation, May 2017, pp. 5118-5125.
Shotton, "Scene Coordinate Regression Forests for Camera Relocalization in RGB-D Images", IEEE Conference on Computer Vision and Pattern Recognition, Jun. 2013, pp. 2930-2937.

* cited by examiner

*Primary Examiner* — Phuoc Tran
(74) *Attorney, Agent, or Firm* — Tutuniian & Bitetto, P.C.; Randall Bluestone

(57) ABSTRACT

Object localization based on spatial relationships can be performed by obtaining a plurality of 3D coordinates within a 3D space, generating a feature vector for each coordinate based on quantified spatial relationships between the corresponding coordinate and one or more other coordinates among the plurality of coordinates, and applying a regression process to the feature vectors to produce a locating function for relating quantified spatial relationships among the plurality of coordinates and a location within the 3D space.

14 Claims, 6 Drawing Sheets

OBJECT LOCALIZATION BASED ON SPATIAL RELATIONSHIPS

BACKGROUND

Technical Field

The present invention relates to object localization based on spatial relationships. More specifically, the present invention relates to inferring a 3D position within a known environment from image data based on spatial relationships of objects within the image data.

Description of the Related Art

Object localization techniques include inferring the 3D position of an object within a known environment from an image. For example, given an image with depth information, such as an RGB-D (Red, Green, Blue, Depth) image, frame $x \in X$, object localization is used to find the 3D position of the visualized objects in the image of an offline training map $y \in Y$. This is also casually known as the "kidnapped robot" problem. Training data can include the offline training map with RGB-D images sampled from either the actual environment or, in the case of perfect texture information, the training map. From the objects' positions, it is possible to calculate the position and orientation of the camera that captured the image.

Random Forests (RF) regression is commonly used to perform such object localization. For example, an input RGB-D frame is randomly sampled into patches, and each patch is encoded into a feature vector. RF regression is then applied to the feature vector, which learns to regress a 3D position from the vector. RF regression has the advantage of being faster and easier to train than neural networks.

SUMMARY

According to an aspect of the present invention, a computer program product is provided that includes one or more computer readable storage mediums collectively storing program instructions that are executable by a computer to cause the computer to perform operations including obtaining a plurality of 3D coordinates within a 3D space, generating a feature vector for each coordinate based on quantified spatial relationships between the corresponding coordinate and one or more other coordinates among the plurality of coordinates, and applying a regression process to the feature vectors to produce a locating function for relating quantified spatial relationships among the plurality of coordinates and a location within the 3D space.

An aspect of the present invention can also include a method performed by a processor executing the instructions of the above computer program product, and an apparatus that performs the method.

The summary clause does not necessarily describe all necessary features of the embodiments of the present invention. The present invention can also be a sub-combination of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Other approaches assume that features within a given space are distinctive enough to allow the RF to learn a regression. However, there are many applications in which repeated objects are found in such a space, and if the RF cannot differentiate between objects with the same appearance in different locations, then the RF will not reliably be able to distinguish areas within the space. In these scenarios, RF, as implemented in these other approaches, is completely unable to provide meaningful results.

In embodiments of the present invention, regression is used to infer a 3D position within space by utilizing spatial relationships of such repeated objects. For example, let $x \in X$ be an input from the RGB-D image data captured in the known 3D space, such as 3D coordinates, relative to the position of the image capturing device, of repeated objects identified in the RGB-D image data. Let $y \in Y$ be the actual 3D coordinates of all of the repeated objects in the known 3D space. Let $x^* = h(x)$ be a nonlinear transformation of the input into an arbitrary space, which can be referred to as a feature vector. Let $\hat{y} = \varphi(x^*)$ be the regression function of a Random Forest mapping the transformed input to an output $\hat{y}$ such that the localization error $$d = \min_{\hat{y}} \|y - \hat{y}\|$$

is minimized. In this example, a transformation space $h(x)$ encodes topology in the form of relative positioning of such repeated objects rather than the local appearance and morphology of the repeated objects. The space defined by h(x) encodes unique local topologies, allowing the RF to learn a meaningful regression for object localization.

Embodiments of the present invention allow creation of a digital representation of a three-dimensional (3D) scene represented in an image captured by a camera or other image capturing device. The digital representations produced by embodiments of the present invention can be used in autonomous robot localization and machine vision. For example, in robot localization, a robot equipped with image capturing devices used as sensors can determine the position of the image capturing devices (and by extension, the robot's position) relative to objects in a 3D space, as well as the absolute position of the robot within the 3D space. This information can be used by the robot for navigation and other tasks involving spatial interactions.

Figure 1:
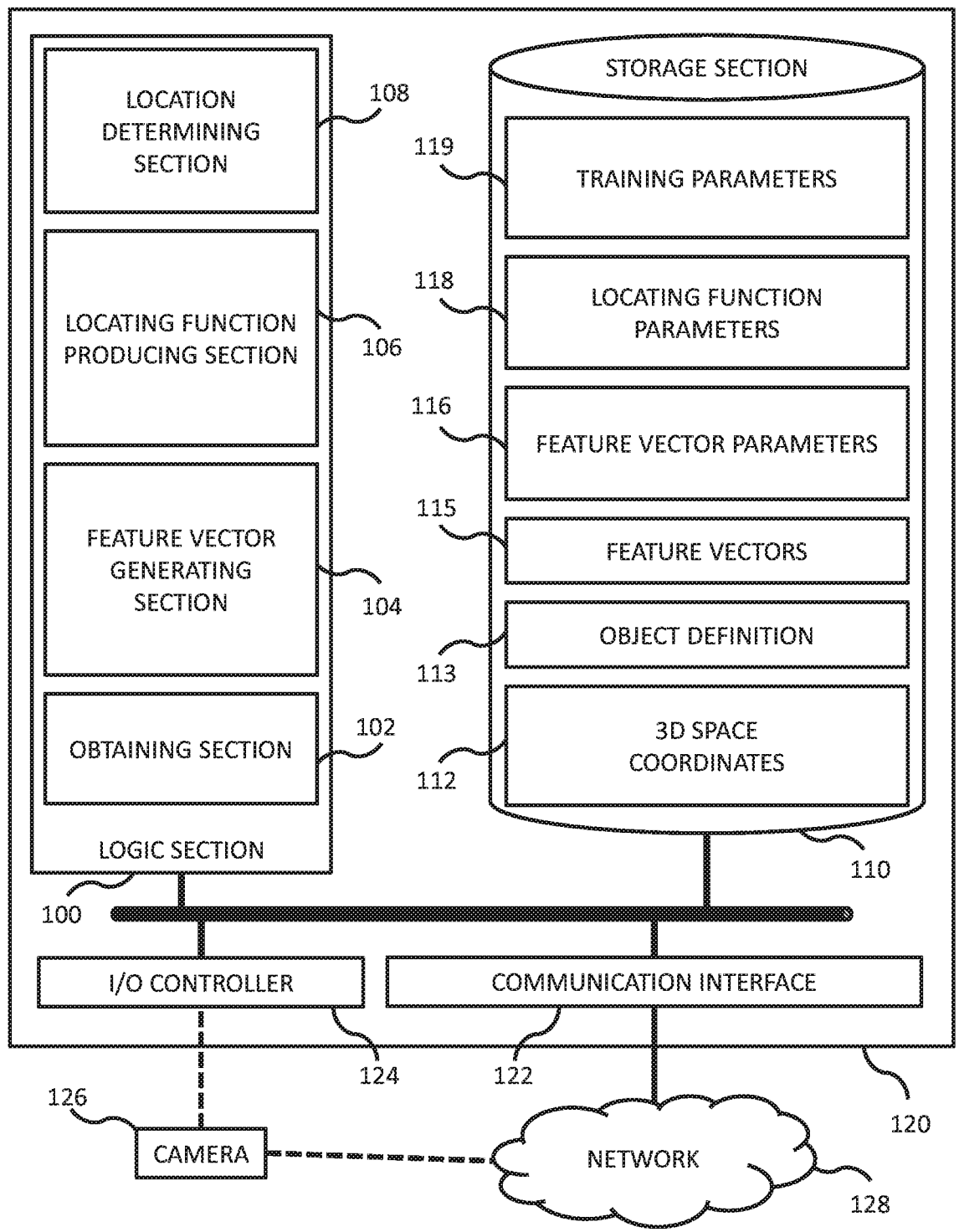
FIG. 1 shows an exemplary hardware configuration for object localization based on spatial relationships, according to an embodiment of the present invention.

FIG. 1 shows an exemplary hardware configuration for object localization based on spatial relationships, according to an embodiment of the present invention. The exemplary hardware configuration includes apparatus 120, which communicates with network 128, and interacts with a camera 126. Apparatus 120 can be a host computer such as a server computer or a mainframe computer that executes an on-premise application and hosts client computers that use it, in which case apparatus 120 may not be directly connected to camera 126, but is connected through a terminal device through network 128. Apparatus 120 can be a computer system that includes two or more computers. Apparatus 120 can be a personal computer that executes an application for a user of apparatus 120.

Apparatus 120 includes a logic section 100, a storage section 110, a communication interface 122, and an input/output controller 124. Logic section 100 can be a computer program product including one or more computer readable storage mediums collectively storing program instructions that are executable by a processor or programmable circuitry to cause the processor or programmable circuitry to perform the operations of the various sections. Logic section 100 can, alternatively, be analog or digital programmable circuitry, or any combination thereof. Logic section 100 can be composed of physically separated storage or circuitry that interacts through communication. Storage section 110 can be a non-volatile computer-readable medium capable of storing non-executable data for access by logic section 100 during performance of the processes herein. Communication interface 122 reads transmission data, which can be stored on a transmission buffering region provided in a recording medium, such as storage section 110, and transmits the read transmission data to network 128 or writes reception data received from network 128 to a reception buffering region provided on the recording medium. Input/output controller 124 connects to various input and output units, such as camera 126, via a parallel port, a serial port, a keyboard port, a mouse port, a monitor port, and the like to accept commands and present information.

Logic section 100 includes obtaining section 102, feature vector generating section 104, locating function producing section 106, and location determining section 108. Storage section 110 includes 3D space coordinates 112, object definition 113, feature vectors 115, feature vector parameters 116, locating function parameters 118, and training parameters 119.

Obtaining section 102 is the portion of logic section 100 that obtains data from storage section 110 and network 128, in the course of object localization. Obtaining section 102 can include sub-sections for performing additional functions, as described in the flow charts below. Such sub-sections can be referred to by a name associated with their function.

Feature vector generating section 104 is the portion of logic section 100 that generates feature vectors in the course of object localization. In doing so, feature vector generating section 104 can transform relative 3D coordinates of repeated objects identified in RGB-D image data based on spatial relationships among the relative 3D coordinates of the identified repeated objects. Feature vector generating section 104 can include sub-sections for performing additional functions, as described in the flow charts below. Such sub-sections can be referred to by a name associated with their function.

Locating function producing section 106 is the portion of logic section 100 that applies a regression process to the feature vectors to produce a locating function in the course of object localization. For example, the locating function can relate quantified spatial relationships among coordinates and a location within a known 3D space. Locating function producing section 106 can include sub-sections for performing additional functions, as described in the flow charts below. Such sub-sections can be referred to by a name associated with their function.

Location determining section 108 is the portion of logic section 100 that determines a location within the known 3D space in the course of object localization. In doing so, location determining section 108 can utilize the locating function to process a feature vector of unknown location, resulting in an output of a location within the known 3D space. Location determining section 108 can include sub-sections for performing additional functions, as described in the flow charts below. Such sub-sections can be referred to by a name associated with their function.

In other embodiments, the apparatus can be any other device capable of processing logical functions in order to perform the processes herein. The camera can be any other device capable of inputting image data to the apparatus, such as RGB-D data to perform object localization. The apparatus may not need to be connected to a network in environments where the input, output, and all information is directly connected. The logic section and the storage section need not be entirely separate devices, but can share one or more computer-readable mediums. For example, the storage section can be a hard drive storing both the computer-executable instructions and the data accessed by the logic section, and the logic section can be a combination of a central processing unit (CPU) and random access memory (RAM), in which the computer-executable instructions can be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program can be executed by a processor to cause the computer to perform certain operations associated with some or all of the blocks of flowcharts and block diagrams described herein.

Figure 2:
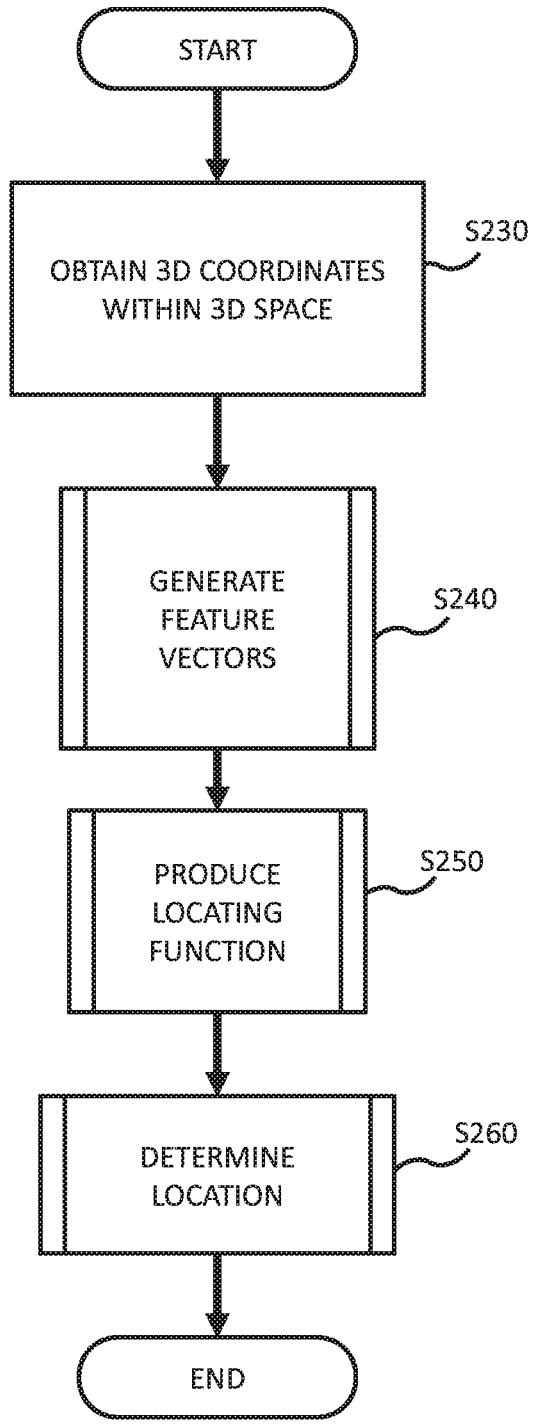
FIG. 2 shows an operational flow for object localization based on spatial relationships, according to an embodiment of the present invention.

FIG. 2 shows an operational flow for object localization based on spatial relationships, according to an embodiment of the present invention. The operational flow can provide a method of object localization based on spatial relationships.

At block S230, an obtaining section, such as obtaining section 102, obtains a plurality of 3D coordinates within a 3D space. In some embodiments, a known 3D space may have been previously mapped out in a digital environment, such as a Computer Aided Design (CAD) environment. Coordinates of repeated objects within such known 3D spaces can be obtained by the obtaining section either through manual entry or automated discovery, such as by image recognition algorithms. The obtaining section can store these 3D coordinates, such as 3D space coordinates 112 within storage section 110.

At block S240, a feature vector generating section, such as feature vector generating section 104, generates a feature vector for each 3D coordinate based on quantified spatial relationships between the corresponding coordinate and one or more other coordinates among the plurality of coordinates. The feature vector generating section can store these feature vectors, such as feature vectors 115 within storage section 110.

At block S250, a locating function producing section, such as locating function producing section 106, applies a regression process to the feature vectors to produce a locating function for relating quantified spatial relationships among the plurality of coordinates and a location within the 3D space. In some embodiments, the locating function applies a type of regression known as Random Forests. However, it is also possible to apply other types of regression, and types of functions other than regression, such as by using neural networks, etc. The locating function producing section can store the locating function parameters, such as locating function parameters 118 within storage section 110.

At block S260, a location determining section, such as locating determining section 208, determines a location within the known 3D space by applying the locating function produced at block S250 to a feature vector generated from a group of relative 3D coordinates with an unknown location within the known 3D space.

Figure 3:
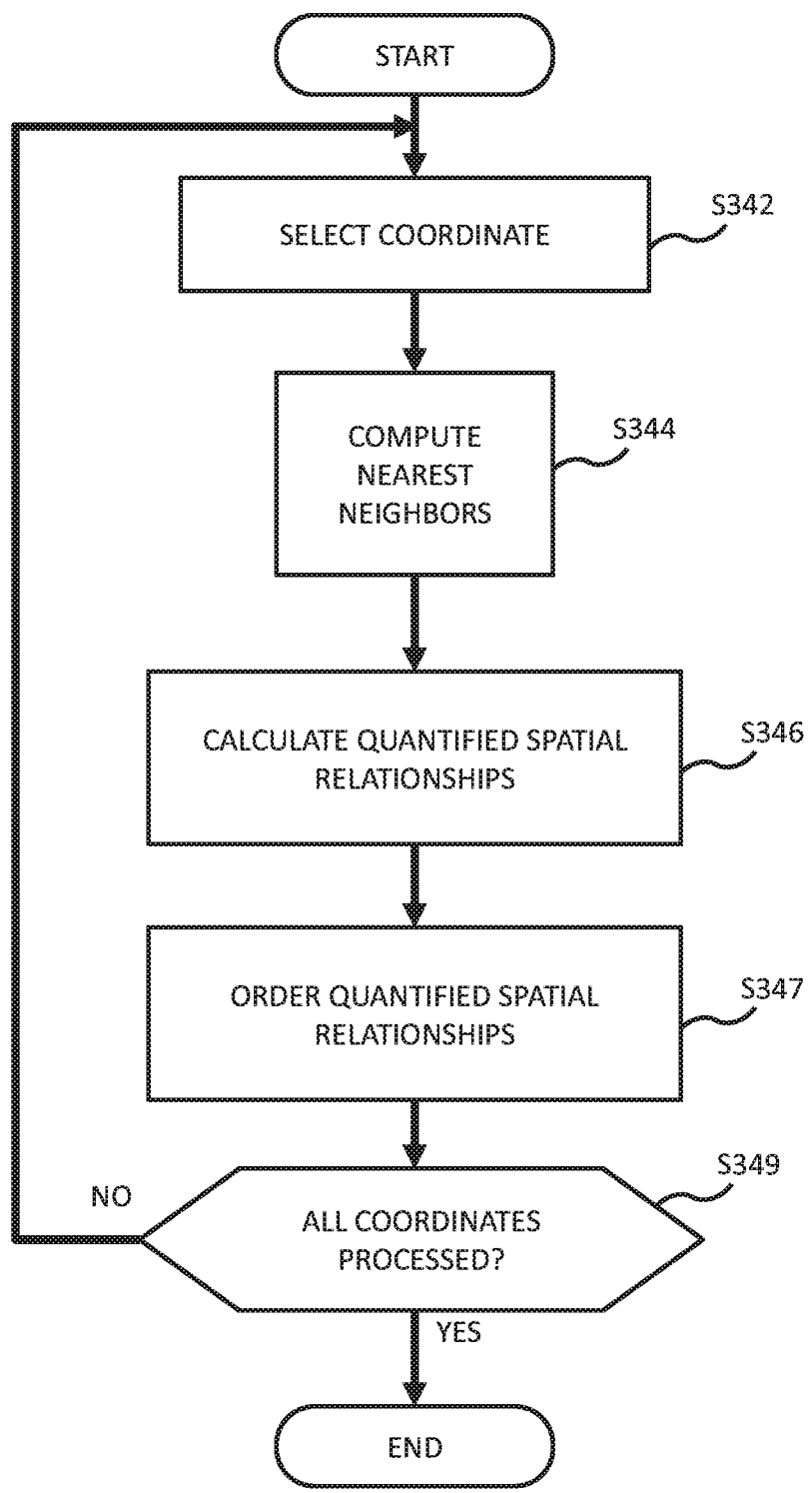
FIG. 3 shows an operational flow for generating feature vectors, according to an embodiment of the present invention.

FIG. 3 shows an operational flow for generating feature vectors, such as block S240 in FIG. 2, according to an embodiment of the present invention. The operations within this operational flow can be performed by a feature vector generating section, such as feature vector generating section 104, or a correspondingly named sub-section thereof. As described in FIG. 2, coordinates of repeated objects within the known 3D space are obtained prior to feature vector generation. This set of 3D coordinates can be referred to as M.

At block S342, a coordinate selecting section, such as feature vector generating section 104 or a sub-section thereof, selects a coordinate among the set of 3D coordinates M. As iterations of the operational flow for generating feature vectors proceed, only previously unselected coordinates can be selected at block S342, to ensure that a feature vector is generated for each coordinate.

At block S344, a nearest neighbor computing section, such as feature vector generating section 104 or a sub-section thereof, computes the nearest coordinates to the coordinate selected at S342. In some embodiments, the set of M 3D coordinates is input into a K-dimensional tree for fast lookup of the "nearest neighbor" coordinates. As iterations of the operational flow for generating feature vectors proceed, the nearest neighbor computing section looks up, for each of the M coordinates, (N−1) nearest neighbors from the K-dimensional tree to create a set of N coordinates. The tunable parameter N indicates the total amount of 3D coordinates to consider when generating a feature vector. An amount of coordinates N among the one or more other coordinates between which the feature vectors for each coordinate are generated is the same for each feature vector.

At block S346, a spatial relationship quantifying section, such as feature vector generating section 104 or a sub-section thereof, quantifies spatial relationships among the selected coordinate and the nearest neighbor coordinates. The spatial relationships can be quantified by distance, area, angle, or any other measurable aspect between two or more coordinates with the set of N coordinates. The spatial relationship quantifying section can refer to stored feature vector parameters, such as feature vector parameters 116 within storage section 110.

FIGS. 4A-E show quantified spatial relationships among coordinates within a 3D space, according to an embodiment of the present invention. For purposes of showing the example in FIGS. 4A-E, depth information is not shown. However, it should be apparent to those having skill in the art that the following procedures apply when depth information is present.

Figure 4A:
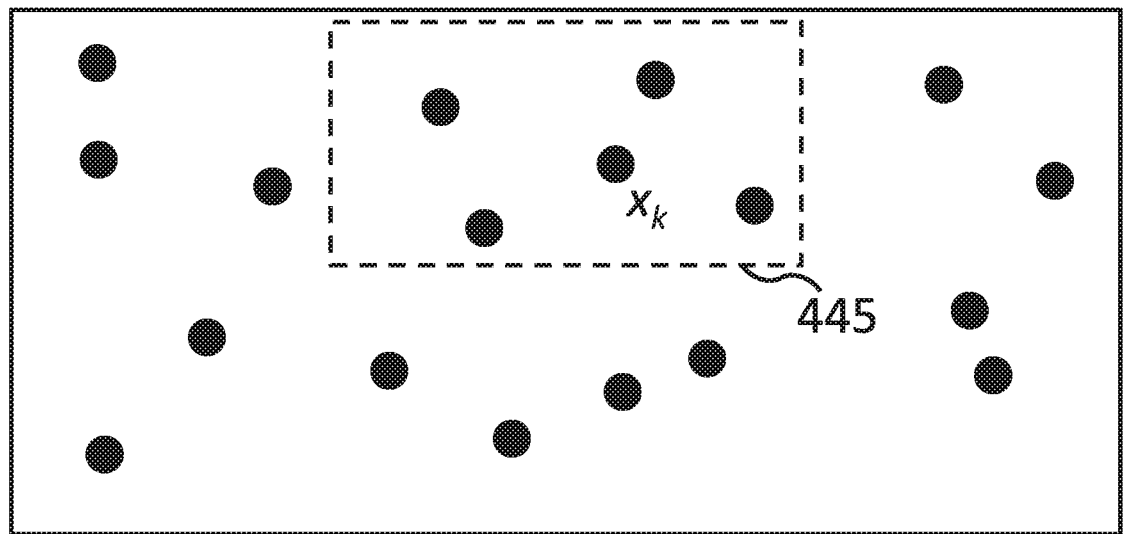
FIG. 4A shows a set of 3D coordinates within a known 3D space, according to an embodiment of the present invention.

FIG. 4A shows a set of 3D coordinates M within a known 3D space 412, according to an embodiment of the present invention. Each of the plurality of 3D coordinates within the 3D space 412, such as $x_k$, is associated with one of a plurality of objects within the 3D space 412, the plurality of objects including the subset of objects. If the coordinate $x_k$ is selected at block S342, then at block S344, a set of nearest neighbors is selected to create a set of N coordinates as shown within box 445, assuming N is 5. The spatial relationships are then quantified among the N coordinates.

Figure 4B:
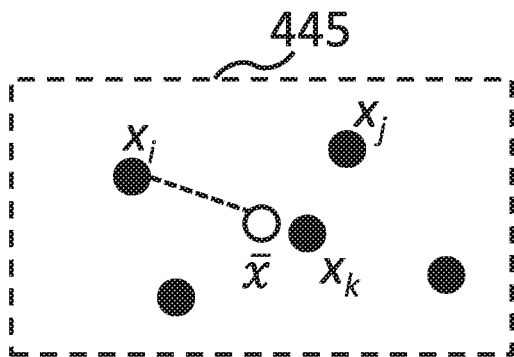
FIG. 4B shows a particular quantified relationship concerning the centroid of the set of coordinates, according to an embodiment of the present invention.

FIG. 4B shows a particular quantified relationship C concerning the distance between each coordinate and the centroid $\bar{x}$ of the set of N coordinates, according to an embodiment of the present invention. In this quantified relationship, the N centroid $\bar{x}$ is calculated according to the following formula:

$$\bar{x} = \frac{1}{N}\sum_{i=1}^{N} x_i \qquad \text{Equation 1}$$

While the relationship C is defined by $$C=\{\|x_i-\bar{x}\|\}, i \in [1,N] \qquad \text{Equation 2}$$

Then, the spatial relationship quantifying section calculates the Euclidean distance between each coordinate $x_i$ and centroid $\bar{x}$.

Figure 4C:
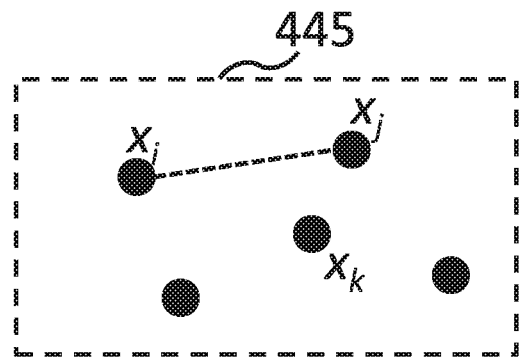
FIG. 4C shows a particular quantified relationship concerning the distance between coordinates, according to an embodiment of the present invention.

FIG. 4C shows a particular quantified relationship D concerning the distance between coordinates, according to an embodiment of the present invention. In this quantified relationship, the spatial relationship quantifying section calculates the Euclidean distance between all pairs of coordinates according to the following formula:

$$D=\{\|x_i-x_j\|\}, i,j \in [1,N], i \neq j \qquad \text{Equation 3}$$

Figure 4D:
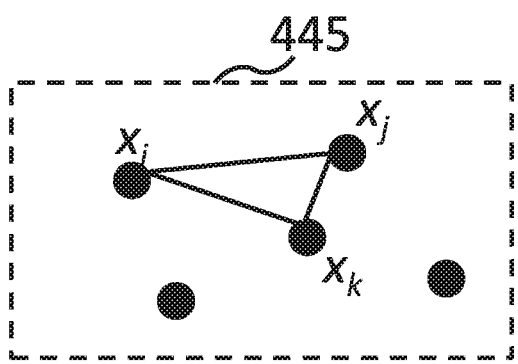
FIG. 4D shows a particular quantified relationship concerning triangles formed by triplets of coordinates, according to an embodiment of the present invention.

FIG. 4D shows a particular quantified relationship A concerning triangles formed by triplets of coordinates, according to an embodiment of the present invention. In this quantified relationship, the spatial relationship quantifying section calculates the square root of the area of the triangle formed by all of the triplets of coordinates according to the following formula:

$$A = \left\{\sqrt{\frac{1}{2}|(x_i-x_j)\times(x_k-x_i)|}\right\}, \qquad \text{Equation 4}$$
$$i, j, k \in [1,N], i \neq j \neq k$$

Figure 4E:
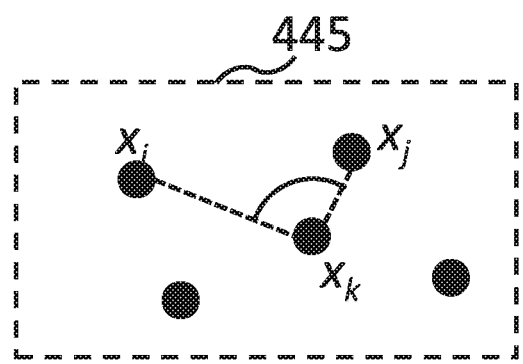
FIG. 4E shows a particular quantified relationship concerning angles formed by triplets of coordinates, according to an embodiment of the present invention.

FIG. 4E shows a particular quantified relationship B concerning angles formed by triplets of coordinates, according to an embodiment of the present invention. In this quantified relationship, the spatial relationship quantifying section calculates all of the angles in each of the triangles formed by all of the triplets of coordinates according to the following formula:

$$B = \left\{ \cos^{-1} \frac{(x_i - x_j) \cdot (x_k - x_j)}{\|x_i - x_j\| \|x_k - x_j\|}, \right.$$
$$\left. \cos^{-1} \frac{(x_j - x_i) \cdot (x_k - x_i)}{\|x_j - x_i\| \|x_k - x_i\|}, \cos^{-1} \frac{(x_i - x_k) \cdot (x_j - x_k)}{\|x_i - x_k\| \|x_j - x_k\|} \right\}, \quad \text{Equation 5}$$
$$i, j, k \in [1, N], i \neq j \neq k$$

At block S347, a quantified spatial relationship ordering section, such as feature vector generating section 104 or a sub-section thereof, orders the quantified spatial relationships within each type of quantified spatial relationship from largest to smallest. For example, within the particular quantified relationships C concerning the distance between each coordinate and the centroid $\bar{x}$ of the set of N coordinates, the distances C are ordered from largest to smallest. The quantified spatial relationship ordering section similarly orders particular quantified relationships D, A, and B. In some embodiments, the feature generation section then concatenates the quantified spatial relationships, the resulting concatenation becomes the feature vector for the set of N coordinates corresponding to the selected coordinate. Thus, generating a feature vector includes ordering the quantified spatial relationships within each type of quantified spatial relationship from largest to smallest. By ordering the quantified spatial relationships from largest to smallest, the order of features within each feature vector will be consistent between training and operation. Although consistency between training and operation is significant, there are many ways of modifying the feature vector to achieve this. Such modifications can include some form of ordering and concatenation, but can also include more complex manipulations of the elements within a feature vector. The goal of any such modifications can be so that the locating function can learn the position of dispositive features within the feature vectors, which can increase the precision of the locating function.

At block S349, a feature vector generating section, such as feature vector generating section 104, determines whether all of the coordinates have been processed by the feature vector generating section. If any coordinates remain unprocessed, then the operational flow returns to block S342, where another coordinate is selected for processing. If no coordinates remain unprocessed, then the operational flow for generating feature vectors is complete.

In the foregoing embodiment of the operational flow for generating feature vectors, specific spatial relationships are used. In other embodiments, different quantified spatial relationships can be used. The number of spatial relationships can be different in different embodiments as well. In other embodiments, the order of the spatial relationships can be different, or unchanged.

Figure 5:
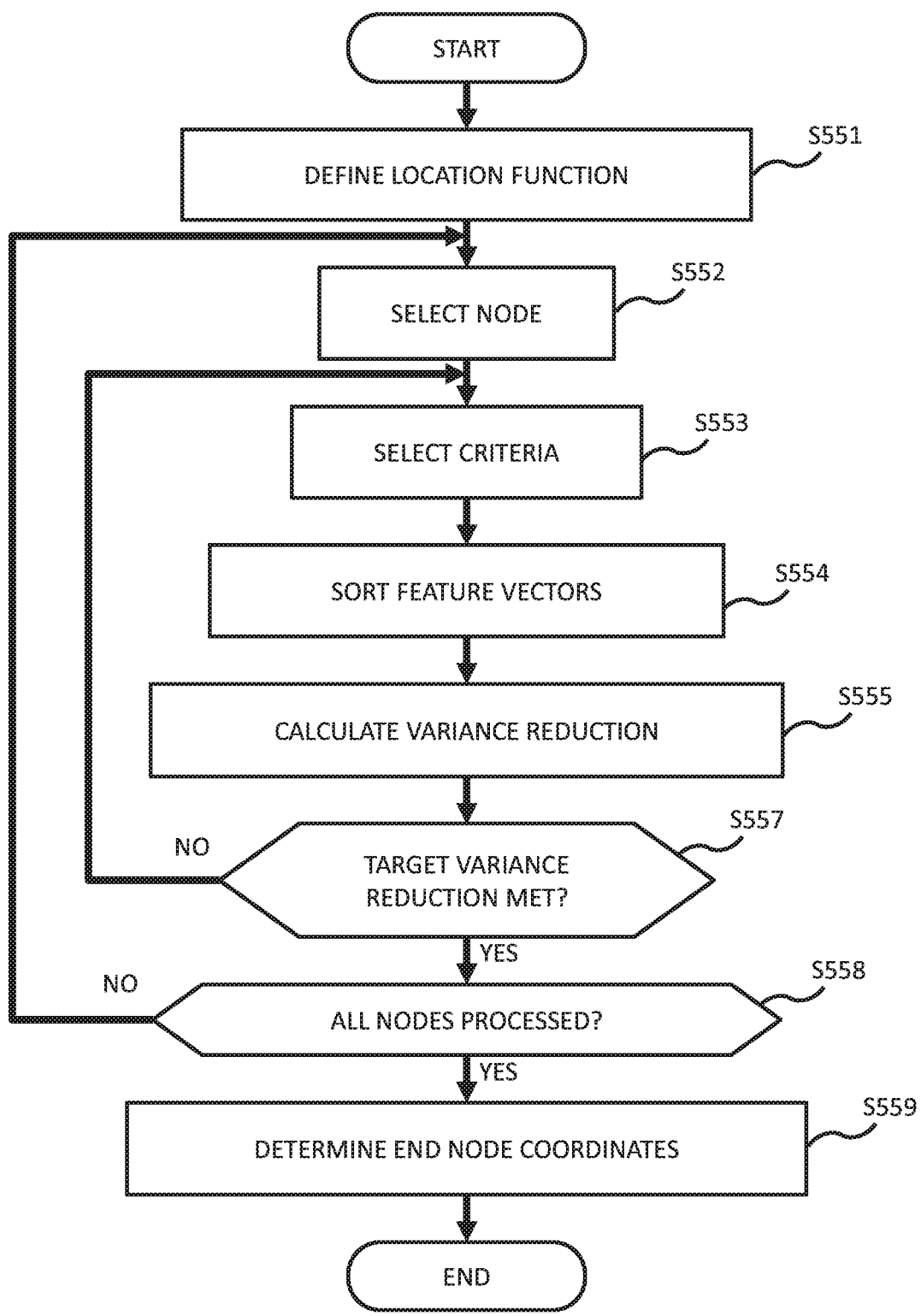
FIG. 5 shows an operational flow for producing a locating function, according to an embodiment of the present invention.

FIG. 5 shows an operational flow for producing a locating function, according to an embodiment of the present invention. The operations within this operational flow can be performed by a locating function producing section, such as locating function producing section 106, or a correspondingly named sub-section thereof. The locating function producing section can refer to stored training parameters, such as training parameters 119 within storage section 110.

At block S551, a location function defining section, such as locating function producing section 106 or a sub-section thereof, defines the parameters of a locating function. In this embodiment, the locating function applies a random forests regression, the parameters of which can include the number of trees, the number of nodes in each tree, etc. In other embodiments, the locating function can apply other types of regression, such as pattern matching regression. In some embodiments, the locating function can be a neural network.

At block S552, a node selecting section, such as locating function producing section 106 or a sub-section thereof, selects a node from among the trees in the random forests regression. As iterations of the operational flow for producing the locating function proceed, only previously unselected nodes can be selected at block S552, to ensure that each node is processed. Also, a child node may not be selected before its parent node has been processed.

At block S553, a criteria selecting section, such as locating function producing section 106 or a sub-section thereof, selects criteria for the selected node, such as which spatial relationship of the feature vectors to consider, and the threshold value for separating the feature vectors into clusters. These criteria can be randomly selected without regard to previously selected criteria. In some embodiments, it can be possible to evaluate all possible criteria, but in most embodiments this will not be the case, because it requires the possibilities to be finite, and to be computationally feasible.

At block S554, a feature vector sorting section, such as locating function producing section 106 or a sub-section thereof, sorts the feature vectors with the selected node according to the selected criteria. For the top level node of a tree, referred to as the root node, the feature vector sorting section applies the threshold value to the respective element of each feature vector in order to sort all of the feature vectors into two clusters. Each of those clusters can be associated with a lower level node, referred to as a child node with respect to the root node. For child nodes, the feature vector sorting section applies the threshold value to all of the feature vectors within the cluster associated with that child node.

At block S555, a variance reduction calculating section, such as locating function producing section 106 or a sub-section thereof, calculates the variance reduction of the resulting clusters as sorted according to the selected criteria. The variance reduction is a measure of the proximity of the coordinates associated with the feature vectors of each cluster. The variance reduction can be calculated from the difference in coordinates by dimension. The larger the difference in coordinates, the smaller the variation reduction. This difference can refer to the statistical variance.

At block S557, a locating function producing section, such as locating function producing section 106, determines whether the variance reduction meets a target value. If the variance reduction is lower than the target value, then the operational flow returns to block S553. If the variance reduction is equal to or greater than the target value, then the operational flow proceeds to block S558. Thus, for each node, various criteria is applied and tested until criteria that effectively sorts the feature vectors is found. As iterations proceed, effective criteria is found for each node of each tree.

At block S558, a locating function producing section, such as locating function producing section 106, determines whether all of the nodes have been processed by the locating function producing section. If any nodes remain unprocessed, then the operational flow returns to block S552, where another node is selected for processing. If no nodes remain unprocessed, then the operational flow proceeds to block S559.

At block S559, a leaf node coordinate determining section, such as locating function producing section 106 or a sub-section thereof, determines a coordinate for each leaf node. A leaf node is a node from which no further child nodes exist. Once all of the criteria for each node has been determined for each tree, the feature vectors are sorted all the way through each tree into clusters at the leaf nodes. The leaf node coordinate determining section determines a coordinate for each section equal to the average of the coordinates corresponding to the features in the cluster. In some instances, the leaf node cluster will only include a single feature vector, and the average will be equal to the corresponding coordinate. In other instances, the leaf node cluster will include multiple feature vectors, and the average will be the centroid of the corresponding coordinates.

In the foregoing embodiment of the operational flow for producing a locating function, the criteria is determined one node at a time. However, in other embodiments, the criteria can be determined for more than one node, for a whole tree, or for the whole forest. Also, while in this embodiment the criteria is set upon a target variance reduction being met, in other embodiments criteria will be continuously tested until a certain amount of criteria has been tested. Once the certain amount has been tested, the criteria that maximized the variance reduction will be set as the criteria for that node. Other embodiments can utilize methods other than variance reduction to determine the effectiveness of criteria. Further embodiments can employ an algorithm for selecting new criteria at block S553 instead of randomly selecting criteria.

Figure 6:
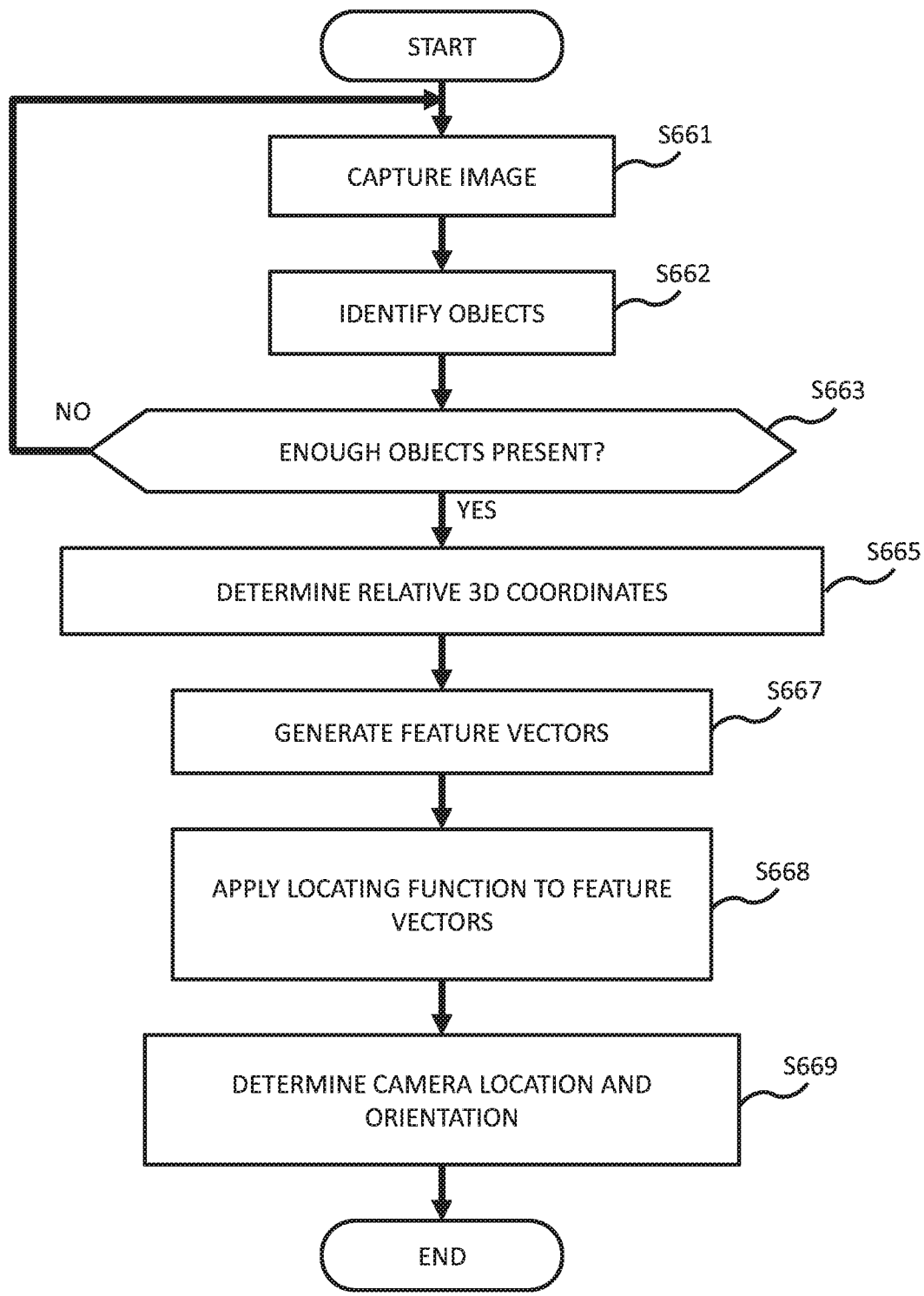
FIG. 6 shows an operational flow for determining a location, according to an embodiment of the present invention.

FIG. 6 shows an operational flow for determining a location, according to an embodiment of the present invention. The operations within this operational flow can be performed by a location determining section, such as location determining section 108, or a correspondingly named sub-section thereof.

At block S661, an image capturing section, such as location determining section 108, or a sub-section thereof, captures at least one image within the 3D space. The capturing includes capturing the at least one image with an image capturing device, such as camera 126, which can be in direct communication with the image capturing section, or in indirect communication, such as through a network.

At block S662, an object identifying section, such as location determining section 108, or a sub-section thereof, identifies each of the repeated objects in the image. In some embodiments, the object identifying section refers to an objection definition, such as object definition 113, to identify all of the objects in accordance with the object definition. The object identifying section can utilize an object identification classifier to aid in identifying objects in the image.

At block S663, a location determining section, such as location determining section 108, determines whether enough objects are present in the captured image data. The capturing includes capturing the at least one image such that at least an N amount of objects is captured in the at least one image. As stated earlier, an amount of coordinates N among the one or more other coordinates between which the feature vectors for each coordinate are generated is the same for each feature vector, and is also the same as the amount of objects among the subset of objects. Although the N parameter can be changed, it must be consistent from generation of the feature vectors for producing the locating function through location determination, because the locating function is trained to input feature vectors of a certain length, and output a coordinate consistent with an amount of coordinates N. If less than N objects are present, then the operational flow returns to block S661, where more image data is captured. The image data capture can be multiple discrete images or can be continuous, such as in a video feed or a panoramic image. In other words, not all of the N objects must be present in a single frame, as long as relative coordinate data among the N objects can be identified. Some embodiments include Simultaneous Localization and Mapping (SLAM) modules to calculate relative coordinate data across multiple discrete or continuous images, even when less than N objects are present at any single time by accumulating their coordinates over time. Once the relative coordinates of at least N objects can be obtained, then the operational flow proceeds to S665.

At block S665, a relative 3D coordinate determining section, such as location determining section 108, or a sub-section thereof, determines the relative 3D coordinate of each of the subset of objects from at least one image. In other words, the location determining section obtains a relative 3D coordinate of each of a subset of objects within the 3D space, the subset of objects being a subset of at least N objects from within the M objects in the known 3D space.

At block S667, a feature vector generating section, such as feature vector generating section 104, generates a feature vector for each relative coordinate based on quantified spatial relationships between the corresponding relative coordinate and one or more other relative coordinates among the subset of objects. In order for the locating function to properly determine the location, the quantified spatial relationships on which the feature vectors for each coordinate are generated are the same as the quantified spatial relationships on which the feature vectors for each relative coordinate are generated. Each feature vector must be similarly ordered and concatenated as well.

At block S668, a locating function applying section, such as location determining section 108, or a sub-section thereof, applies the locating function to the feature vectors generated from the relative coordinates of the subset of objects captured in the image data, in order to estimate a location within the 3D space by using the locating function. Upon application of the locating function to the feature vectors, an estimated coordinate is output from the locating function that is representative of the subset of coordinates. In embodiments where the locating function utilizes a random forests regression, each feature vector is passed through each tree until the feature vectors reach a leaf node. The coordinates determined for the leaf nodes reached by each tree for a single feature vector are then further processed into a single coordinate, representing the average, median, mode, etc. The same is performed for all of the feature vectors, and the resulting single coordinates are again further processed into a location estimate representing the average, median, mode, etc. If the subset is exactly N objects, then all of the feature vectors will be the same, and all of the single coordinate outputs of the random forests regression will be the same, and will be the same as the location estimate output from the locating function. However, if there are more than N objects, then different feature vectors will be made, and the single coordinate outputs of the random forests regression will be different, prompting the locating function to further process the single coordinate outputs into a single location estimate. This location estimate can be an estimated location of the subset of at least N objects. In addition to the location estimate, a confidence can be output, based on the variance in output of individual trees in consideration of the same feature vector. When the resulting single coordinates for each feature vector are further processed into a location estimate, any resulting single coordinates for which the confidence was too low can be discarded. For example, a low confidence can indicate that the feature vector derived from a relative coordinate may not actually correspond to any of the feature vectors generated during training. The locating function can provide incorrect information for any such feature vectors, and thus discarding these can improve the accuracy of the estimated location. However, the location and orientation of a camera can ultimately be the desired location to estimate.

Therefore, at block S669, a camera location determining section, such as location determining section 108, or a sub-section thereof, determines a location and orientation of the image capturing device. In some embodiments, the camera location determining section determines the camera location and orientation based on the relative coordinates of the subset of objects and their appearance from the point of view of the image capturing device in consideration of the single location estimate returned by the locating function at block S668. In this manner, the locating function can directly output a location and orientation of the image capturing device in response to the input of one or more feature vectors.

In the foregoing embodiment of the operational flow for determining a location, objects are identified from the image data in order to determine relative coordinates. Each objects is assumed to correspond to one of the coordinates in the known 3D space. However, in other embodiments, relative coordinates can be identified from the image data in other ways. In some embodiments, object identification may not be necessary at all, as long as correspondence between a location within the image data and coordinates of the known 3D space can be determined.

When compared with other object localization techniques in 3D spaces having repeating objects, embodiments of the present invention can show meaningful clustering of training features, while other object localization techniques fail to provide meaningful results. In testing, some embodiments of the present invention have shown error reduction by 90% compared with other object localization techniques. By considering topology instead of appearance, these embodiments are able to estimate object location, which is otherwise impossible in 3D spaces having repeated objects. Because the size of the training data increases linearly with the number of objects in these embodiments, whereas the training data increases cubically with the size of the space considered by traditional object localization techniques due to the necessity of sampling views of the complete environment volume, spatial relationship based object localization can be more easily scalable. The dimensionality of the feature vector can be calculated in advance and configured to satisfy computational demands.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the embodiments of the present invention include artificial intelligence, and apply regression in particular. Some of the foregoing embodiments describe specific types of regression. However, a function that applies regression usually starts as a configuration of random values. Such untrained functions must be trained before they can be reasonably expected to perform a function with success. Many of the processes described herein are for the purpose of training locating functions for object localization. Once trained, a locating function can be used for object localization, and may not require further training. In this way, a trained locating function is a product of the process of training an untrained locating function.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer program product including one or more computer readable storage mediums collectively storing program instructions that are executable by a computer to cause the computer to perform operations comprising:
obtaining a plurality of 3-Dimensional (3D) coordinates within a 3D space;
generating a feature vector for each 3D coordinate based on quantified spatial relationships between the corresponding 3D coordinate and one or more other 3D coordinates among the plurality of 3D coordinates;
applying a regression process to the feature vectors to produce a locating function for relating the quantified spatial relationships among the plurality of 3D coordinates and a location within the 3D space;
obtaining a relative 3D coordinate of each of a subset of objects within the 3D space;
generating a feature vector for each relative 3D coordinate based on the quantified spatial relationships between the corresponding relative 3D coordinate and one or more other relative 3D coordinates among the subset of objects; and
determining a location within the 3D space by using the locating function,
wherein obtaining the relative 3D coordinate of each of the subset of objects includes:
capturing one or more images within the 3D space,
identifying each of the subset of objects in the one or more images, and
determining the relative 3D coordinate of each of the subset of objects from the one or more images.

2. The computer program product of claim 1, wherein:
the locating function applies a random forests regression, and
applying a regression process includes training the locating function based on variance reduction to output a 3D coordinate representing an estimate of the corresponding 3D coordinate and the one or more other 3D coordinates among the plurality of 3D coordinates of the feature vector.

3. The computer program product of claim 1, wherein:
each of the plurality of 3D coordinates within the 3D space is associated with one of a plurality of objects within the 3D space, the plurality of objects including the subset of objects,
the quantified spatial relationships on which the feature vectors for each 3D coordinate are generated are the same as the quantified spatial relationships on which the feature vectors for each relative 3D coordinate are generated, and
an amount of 3D coordinates among the one or more other 3D coordinates between which the feature vectors for each 3D coordinate are generated is the same for each feature vector, and is also a minimum amount of objects among the subset of objects.

4. The computer program product of claim 1, wherein capturing includes capturing the one or more images such that at least a minimum amount of objects is captured among the one or more images.

5. The computer program product of claim 4, wherein:
capturing includes capturing the at least one image with an image capturing device, and
determining the location includes determining a location of the image capturing device.

6. The computer program product of claim 1, wherein generating a feature vector includes ordering the quantified spatial relationships within each type of quantified spatial relationship from largest to smallest.

7. A computer-implemented method comprising:
obtaining a plurality of 3-Dimensional (3D) coordinates within a 3D space;
generating a feature vector for each 3D coordinate based on quantified spatial relationships between the corresponding 3D coordinate and one or more other 3D coordinates among the plurality of 3D coordinates;
applying a regression process to the feature vectors to produce a locating function for relating the quantified spatial relationships among the plurality of 3D coordinates and a location within the 3D space;
obtaining a relative 3D coordinate of each of a subset of objects within the 3D space;
generating a feature vector for each relative 3D coordinate based on the quantified spatial relationships between the corresponding relative 3D coordinate and one or more other relative 3D coordinates among the subset of objects; and
determining a location within the 3D space by using the locating function,
wherein obtaining the relative 3D coordinate of each of the subset of objects includes
capturing at one or more images within the 3D space,
identifying each of the subset of objects in the one or more images, and
determining the relative 3D coordinate of each of the subset of objects from the one or more images.

8. The computer-implemented method of claim 7, wherein:
the locating function applies a random forests regression, and
applying a regression process includes training the locating function based on variance reduction to output a 3D coordinate representing the average of the corresponding 3D coordinate and the one or more other 3D coordinates among the plurality of 3D coordinates of the feature vector.

9. The computer-implemented method of claim 7, wherein:
each of the plurality of 3D coordinates within the 3D space is associated with one of a plurality of objects within the 3D space, the plurality of objects including the subset of objects,
the quantified spatial relationships on which the feature vectors for each 3D coordinate are generated are the same as the quantified spatial relationships on which the feature vectors for each relative 3D coordinate are generated, and
an amount of 3D coordinates among the one or more other 3D coordinates between which the feature vectors for each 3D coordinate are generated is the same for each feature vector, and is also a minimum amount of objects among the subset of objects.

10. The computer-implemented method of claim 7, wherein capturing includes capturing the one or more images such that at least a minimum amount of objects is captured among the one or more images.

11. An apparatus comprising:
a coordinate obtaining section configured to obtain a plurality of 3-Dimensional (3D) coordinates within a 3D space;
a generating section configured to generate a feature vector for each 3D coordinate based on quantified spatial relationships between the corresponding 3D coordinate and one or more other 3D coordinates among the plurality of 3D coordinates;
an applying section configured to apply a regression process to the feature vectors to produce a locating function for relating the quantified spatial relationships among the plurality of 3D coordinates and a location within the 3D space;
a relative coordinate obtaining section configured to obtain a relative 3D coordinate of each of a subset of objects within the 3D space;
a generating section configured to obtain a feature vector for each relative 3D coordinate based on the quantified spatial relationships between the corresponding relative 3D coordinate and one or more other relative 3D coordinates among the subset of objects; and
a determining section configured to determine a location within the 3D space by using the locating function,
wherein the relative coordinate obtaining section includes:
a capturing section configured to capture one or more images within the 3D space,
an identifying section configured to identify each of the subset of objects in the one or more images, and
a determining section configured to determine the relative 3D coordinate of each of the subset of objects from one or more images.

12. The apparatus of claim 11, wherein:
the locating function applies a random forests regression, and
the applying section is further configured to train the locating function based on variance reduction to output a 3D coordinate representing the average of the corresponding 3D coordinate and the one or more other 3D coordinates among the plurality of 3D coordinates of the feature vector.

13. The apparatus of claim 11, wherein:
each of the plurality of 3D coordinates within the 3D space is associated with one of a plurality of objects within the 3D space, the plurality of objects including the subset of objects,
the quantified spatial relationships on which the feature vectors for each 3D coordinate are generated are the same as the quantified spatial relationships on which the feature vectors for each relative 3D coordinate are generated, and
an amount of 3D coordinates among the one or more other 3D coordinates between which the feature vectors for each 3D coordinate are generated is the same for each feature vector, and is also a minimum amount of objects among the subset of objects.

14. The apparatus of claim 11, wherein the capturing section is further configured to capture the one or more images such that at least a minimum amount of objects is captured among the one or more images.

* * * * *